April 26, 1960     D. M. McMASTER     2,934,155
MULTIPLE CULTIVATOR
Filed May 7, 1957                             2 Sheets-Sheet 1
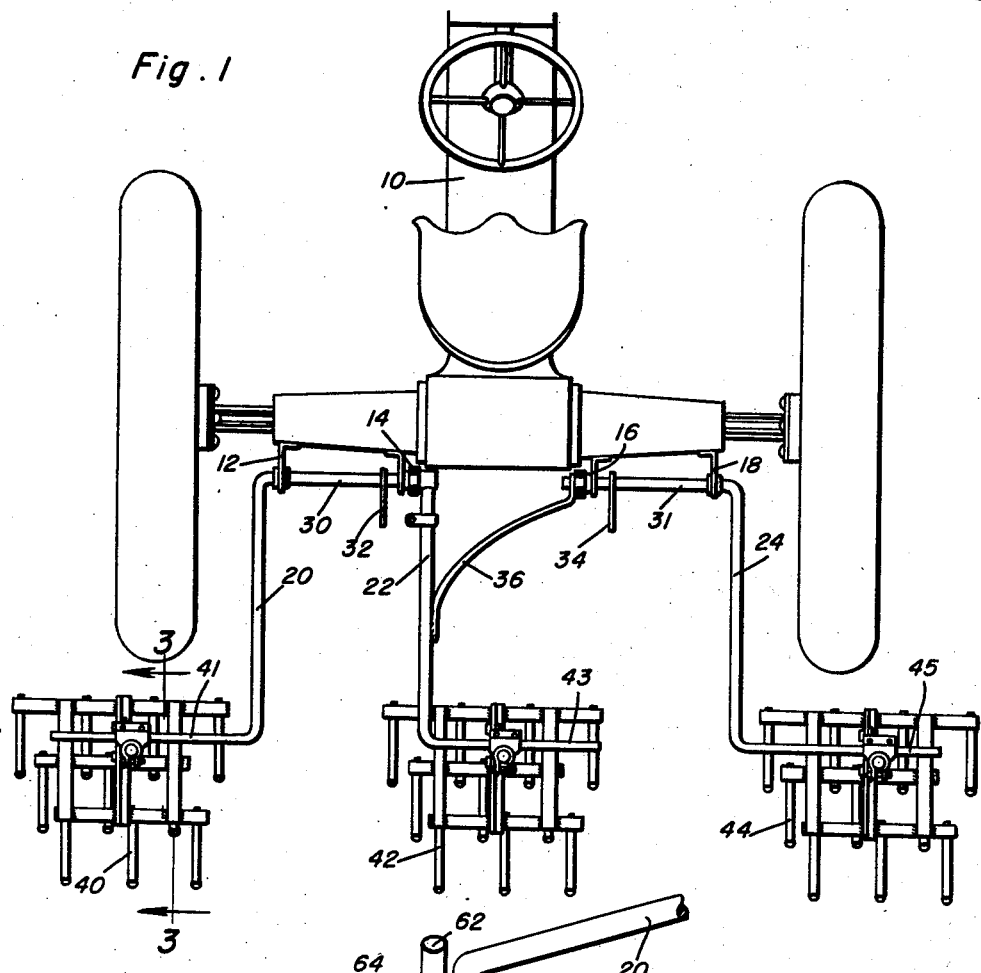
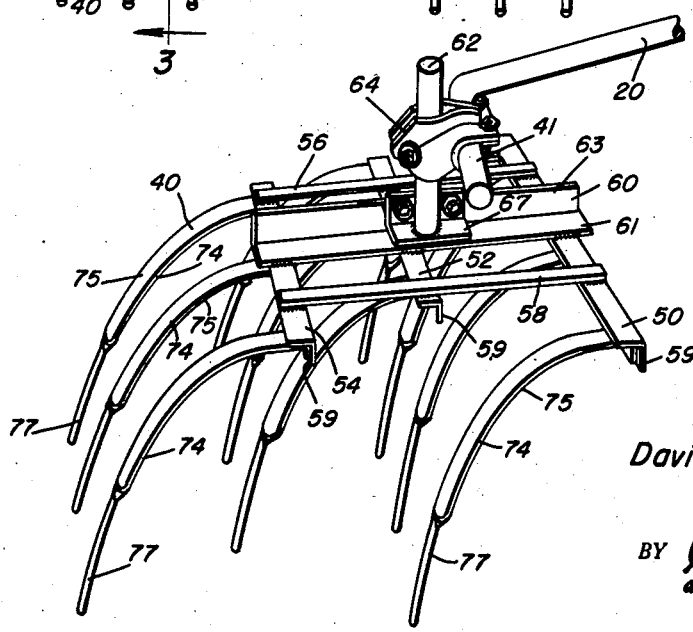
Fig. 1
Fig. 2
David M. McMaster
INVENTOR.

April 26, 1960     D. M. McMASTER     2,934,155
MULTIPLE CULTIVATOR
Filed May 7, 1957     2 Sheets-Sheet 2
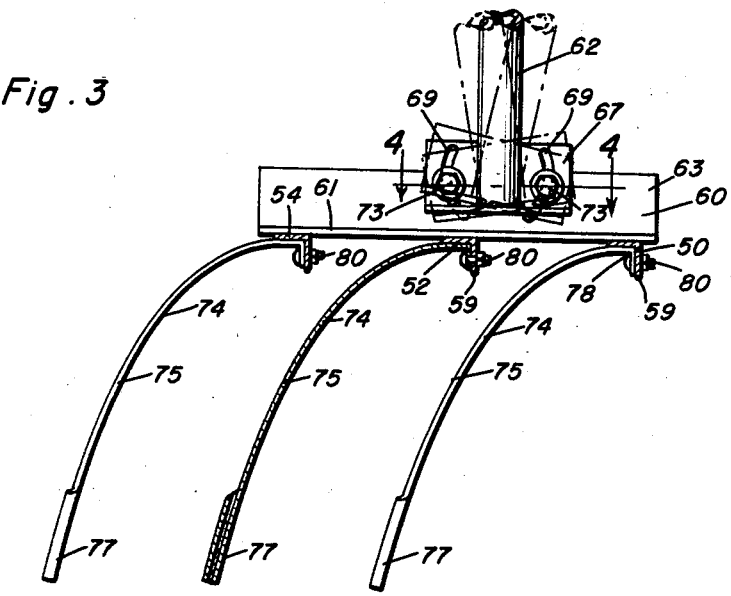
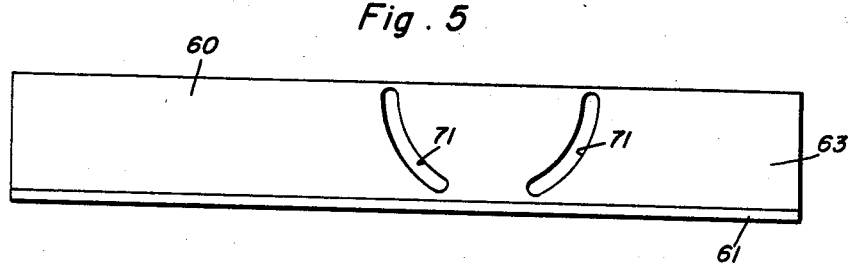
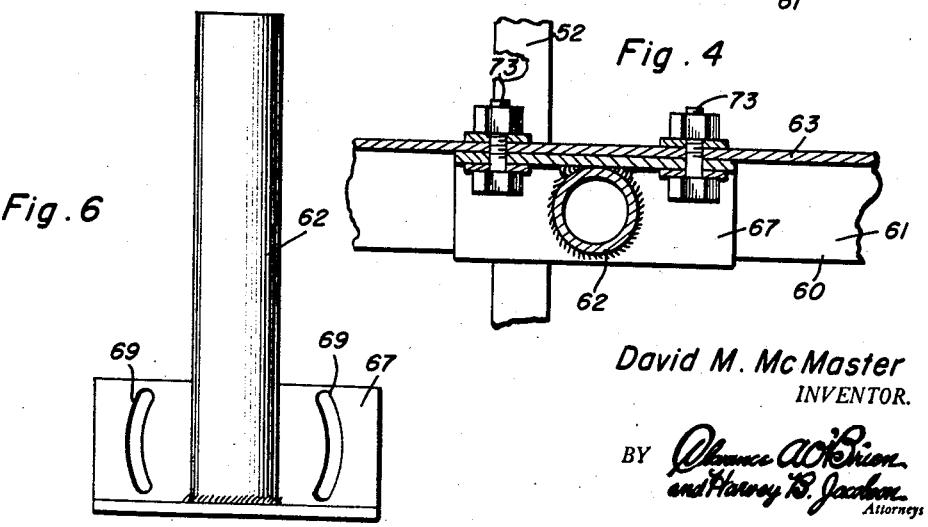
David M. McMaster
INVENTOR.

United States Patent Office 2,934,155
Patented Apr. 26, 1960

2,934,155

MULTIPLE CULTIVATOR

David M. McMaster, Oneida, Ill.

Application May 7, 1957, Serial No. 657,649

1 Claim. (Cl. 172—640)

This invention relates to a cultivator and particularly to a multiple tooth close cultivating substantially weed free cultivator.

In the operation of the cultivators it is desirable to have a large number of relatively fine teeth operating in very close position so as to evenly work the entire surface and provide a fine mulch of relatively level characteristic after the cultivator has passed. However, when these teeth are placed close together in this arrangement the device catches weeds, trash and other material so that it becomes readily clogged and ineffective in operation.

The construction according to the present invention provides a cultivator having the effect of a large number of close together teeth but having the teeth so arranged that the device is substantially weed and trash free. This is accomplished by a mounting frame having a plurality of longitudinally placed mounting bars and securing the same in rigidly spaced parallel relation by means of longitudinally extending frame bars to provide a substantial mounting frame and rigidly connecting a plurality of teeth to each of the mounting bars and so staggering the teeth on the various bars that they produce a pattern of close together teeth but so arranged that this pattern is accomplished by teeth which are relatively wide apart so that weeds, trash and the like may readily be disengaged from the teeth while the teeth themselves will leave the surface relatively smooth as if a plurality of fine teeth close together had passed thereover.

Accordingly, it is an object of the invention to provide an improved cultivator embodying the features discussed above.

Another object of the present invention is to provide an improvement in the cultivator units which enables the cultivators to be adjusted in a fore and aft direction and about a substantially horizontal axis transverse to the line of draft of the implement.

Another object of the present invention is to provide a structurally improved cultivator which is constructed in such manner as to be durable, compact and trouble-free, these objects being achieved by the manner in which the cultivator is assembled and organized.

Other objects and features of importance will become apparent in following the description of the illustrated form of the invention.

In the drawings:

Figure 1 is a top plan view of a cultivator as attached to a tractor;

Figure 2 is a perspective view of one unit of the cultivator of Figure 1;

Figure 3 is a sectional view on an enlarged scale and taken approximately on the line 3—3 of Figure 1;

Figure 4 is an enlarged sectional view taken on the line 4—4 of Figure 3;

Figure 5 is an elevational view of a reinforcing bar constituting part of the invention, and Figure 6 is an elevational view of a post and mounting plate which is adapted to be operatively connected with the reinforcing bar of Figure 5.

In the illustrated embodiment of the invention, there is a conventional tractor 10 which is provided with mounting brackets 12, 14, 16 and 18, respectively, in which hitch bars 20, 22 and 24 are pivotally mounted. Bars 20 and 24 are substantially identical, being Z-shaped in planform but oppositely arranged. They have horizontal front end portions 30 and 31 to which lift levers 32 and 34 are secured. These are preferably connected to the usual hydraulic lift of the tractor so that the hitch bars may be lifted and lowered. Hitch bar 22 is L-shaped and is rigidly connected to the front end portion 30 of the hitch bar 20 and is liftable with it. Diagonal brace 36 is welded or otherwise secured to the hitch bar 22 intermediate the ends thereof and to the inner extremity of the front end portion 31 of lift bar 24. Therefore, the hitch bar 22 which is between the hitch bars 20 and 24, derives its lifting force from both flanking hitch bars 20 and 24. Therefore, the entire multiple cultivator is operable as a unit and will remain in a fixed relationship to the tractor regardless of the adjustment of the multiple unit.

The cultivator is made of a plurality of cultivator units 40, 42 and 44 carried by the horizontal rear end portions 41, 43 and 45 of the hitch bars 20, 22 and 24, respectively. Each unit is identical and it is appreciated that any number of such units may be used to form a single cultivator in accordance with the invention.

Each unit is constructed of a plurality of horizontally arranged transversely disposed and longitudinally spaced mounting bars 50, 52 and 54. The mounting bars are maintained in parallel transverse alignment by means of longitudinally extending frame members 56 and 58 together with an intermediately disposed reinforcing bar 60. Mounting bars 52, 54 and 56 are preferably of angle iron construction and have horizontal upper flanges together with vertical lower flanges as at 59. The frame members 56 and 58 are welded or otherwise secured to the upper flanges of the mounting bars, while the lower, vertical flanges 59 are adapted to support the tines which will be subsequently described.

Reinforcing bar 60 is also preferably of angular cross section and includes a lower horizontal flange 61 which is welded to the mounting bars, together with an upstanding flange 63. Mounting post 62 is adjustably connected to the reinforcing bar 60 and is also adjustably connected to the end portion 41 of hitch bar 20. Clamp 64 is used to make the connection between hitch bar 20 and mounting post 62, the clamp being such as to enable adjustment about the longitudinal axis of portion 41 and also about the longitudinal axis of mounting post 62. In addition, adjustment of the unit is achieved by moving the reinforcing bar 60 about the mounting plate 67 which is of angular cross section and which seats and nests within the angular reinforcing bar 60. A pair of longitudinal slots 69 are formed in the vertical flange of mounting plate 67, and similar slots 71 are formed in the vertical flange 63 of bar 60. Bolt and nut assemblies are passed through the matched slots and when these assemblies 73 are loosened the unit may be adjusted with respect to mounting post 62 and that adjustment held by tightening the assemblies.

The tines 74 are made of flat, elastic bodies 75, for example, spring steel, and the lower end of each is rolled to form a hollow cylindrical tooth 77. An angulated mounting bracket 78 is formed by a right angular, apertured ear at the upper end of each tine. The brackets 78 fit in nested relationship within the mounting bars 50, 52 and 54, and are held in place by bolt and nut assemblies 80. The tines, therefore, are easily replaced but yet, held very securely and firmly by a single bolt. It is noted that parts of the tine bodies come in contact with both the vertical and horizontal flanges of the mounting bars 50, 52 and 54 to which they are connected.

The tines on the various mounting bars are arranged evenly distant with respect to each other and relatively wide apart so that clods, trash, weeds and the like may readily pass through them. Each of the mounting bars have the tines correctly mounted at even distances apart but the tines on the various bars are staggered with respect to each other. For example the tines on mounting bar 52 are staggered inwardly one-third of the distance between the tines on mounting bar 50 and the tines on mounting bar 54 are staggered inwardly two-thirds of the distance so that all of the tines have a spacing such that if they were on the same bar they would be closely and evenly spaced apart.

By arranging each unit with the tines so arranged on the three mounting bars, the effect of a closely spaced tine organization is obtained as far as cultivation is concerned. The pattern of mulch left is level and finely worked. However, by separating the tines on the different mounting bars, the tines are substantially weedless or trashless so that the various trash, clods or the like encountered by the units will be readily passed without disturbing the operation of the cultivator or encumbering the operation thereof in any way.

The multiple adjustments (Figs. 2 and 3) are of importance. Although there are more than one adjustment about approximately horizontal axes, they both serve their useful functions in coordination with each other. One unit may be lifted to a slightly higher elevation than the next, and the various units may assume various angular adjustments to achieve the desired results.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A cultivator comprising a mounting frame having three laterally spaced horizontal coplanar front, rear and intermediate mounting bars respectively, each bar being angular in section and having upper generally horizontal flanges and depending generally vertical flanges, a reinforcing bar which has a flange fitting against the generally horizontal flanges of said mounting bars and rigidly fixed thereto, said reinforcing bar being attached to the front mounting bar in the transverse center thereof, another flange rising vertically from said flange which is fixed to said mounting bars, horizontally disposed reinforcing plates attached to said mounting bars and disposed one on each side of said reinforcing bar, a pair of arcuate slots formed in the other flange of said reinforcing bar, a mounting plate having a vertical member and a horizontal member, a pair of arcuate slots formed in said vertical member complementary to said first mentioned slots, bolts passed through said slots for relative angular movement between said mounting plate and reinforcing bar about a point equidistant from the slots or about a point along one of said slots, draft means on said reinforcing bar for pulling said frame, said draft means comprising a post rising from the horizontal member of said mounting plate, a hitch bar, and a clamp connecting said post to said hitch bar above said reinforcing bar, tines formed of rearwardly curved strap members having right angular mounting brackets formed at their upper ends and comprising mechanical parts which fit in nested relationship within the angularity of the mounting bars, said intermediate and rear mounting bars being staggered longitudinally relative to each other and to the front mounting bar to dispose all of the tines in staggered equidistantly spaced relation longitudinally of the frame and provide a like number of the tines on each side of the line of draft, said cultivator having means at one end by which to attach the same to a tractor, a second cultivator gauged with the first mentioned cultivator, a draft bar to which said second cultivator is attached, and means mechanically connecting the second draft bar to the first mentioned draft means for movement in unison with each other.

References Cited in the file of this patent
UNITED STATES PATENTS

| | | |
|---|---|---|
| 806,056 | Briggs | Nov. 28, 1905 |
| 1,122,837 | Young | Dec. 29, 1914 |
| 1,555,610 | Reynolds | Sept. 29, 1925 |
| 2,064,269 | Pope | Dec. 15, 1936 |
| 2,726,791 | Thompson | Dec. 13, 1955 |